United States Patent [19]

Cross

[11] Patent Number: 5,562,118
[45] Date of Patent: Oct. 8, 1996

[54] EMERGENCY SHUTOFF VALVE WITH A FUSIBLE LINK AND METHOD

[75] Inventor: George A. Cross, Kingwood, Tex.

[73] Assignee: PGI International, Ltd., Houston, Tex.

[21] Appl. No.: 505,702

[22] Filed: Jul. 21, 1995

[51] Int. Cl.[6] ................................................ F16K 31/64
[52] U.S. Cl. ............................................... 137/77; 137/79
[58] Field of Search ................................. 137/75, 77, 79, 137/80

[56] References Cited

U.S. PATENT DOCUMENTS

| | | | |
|---|---|---|---|
| 4,004,601 | 1/1977 | Bachelder et al. | 137/77 |
| 4,432,383 | 2/1984 | Boyette | 137/77 |

OTHER PUBLICATIONS

Catalog L–101, Titled: LP–Gas and Anhydrous Ammonia Equipment (printed Nov. 1983) by Rego Company (Front Cover, p. 25 and Back Cover).
Handout: Indalloy® Fusible Alloys, 10 pages. by Indium Corporation of America.
Handout: Fisher Emergency Shutoff Valves, pp. 18 and 19.
Handout: Rego LP–Gas Emergency Shutoff Valves, 7 pages.

*Primary Examiner*—John Fox
*Attorney, Agent, or Firm*—Browning Bushman

[57] ABSTRACT

A shutoff valve for closing off flow through a fluid line includes a stem 28 axially movable relative to a valve body 12. A valve element 22 is carried by the stem 28 for engagement with a seat 20 to close off fluid flow through the valve, and is biased toward the seat by valve closure spring 40. The swivel body 52 is pivotally connected to the upper end of the stem, and may be rotated to allow the spring 40 to force the valve element into engagement with the seat. A fusible link mechanism 64 is carried by the swivel body for engagement with the valve body to rotate the swivel body to the valved closed position. The mechanism 64 includes a piston 66, a spring 70, and a fusible material for normally acting as a solid stop to prevent the spring 70 from moving piston 66 to rotate the swivel body to the valve closed position. According to the method of the invention, the solid state of the fusible material is altered when the valve is subjected to an elevated temperature, thereby allowing the spring 70 to move the piston 66 to automatically rotate the swivel body and close the valve.

20 Claims, 2 Drawing Sheets

EMERGENCY SHUTOFF VALVE WITH A FUSIBLE LINK AND METHOD

FIELD OF THE INVENTION

The present invention relates to valves of the type designed to close off fluid flow in an emergency. More particularly, the present invention relates to an emergency shutoff valve which may be manually closed, and which includes a fusible link for automatically closing when the valve is subjected to elevated temperatures.

BACKGROUND OF THE INVENTION

Emergency shutoff valves have been used for decades in flow lines which transport hazardous or combustible fluids. In propane flow lines, for example, emergency shutoff valves are frequently required to insure that a ruptured flow line can be quickly shut in to reduce the likelihood of a fire or explosion. An operator may close such a valve during an emergency by flipping a valve handle, which allows a spring to automatically close the valve. Since the emergency shutoff valve may be positioned in a remote location, it is preferable that the handle may alternatively be activated by pulling on a cable which interconnects the valve handle with an operator access area, thereby again closing the valve. Many emergency shutoff valves may be operated by a fusible link closure mechanism which will automatically close the valve during a fire. Other emergency shutoff valves may include a pneumatic closure mechanism to automatically close the valve if a minimum air pressure to the closure mechanism is not maintained.

One type of emergency shutoff valve utilizes a rotatable stem connected to the valve element. A spring is sized to rotate the stem for automatically closing the valve, but is normally prevented from rotating the stem by a link which serves as a stop to prevent stem rotation. By tripping an actuating handle or by pulling on a cable, the link is moved so that the stem is rotated by the spring to close the valve. Problems with this type of emergency shutoff valve include both unintended closing of the valve and the failure to close the valve when intended. The spring must be sized to provide a sufficient force to close the valve, but a strong spring force may also exert sufficient pressure on the link to trip the valve closed when the valve is bumped or if the flow line is subject to abrupt fluid pressure changes. Also, seals on the valve may dry out and cream a variable drag, so that a valve which remains open for a substantial time period may "freeze" in the open position and not close even after the link is moved.

Another type of emergency shutoff valve utilizes a pivot mechanism to move a stem axially, thereby closing the valve. The pivot mechanism interconnects a valve actuating handle with the valve stem. The pivot mechanism holds the stem in an up position when the valve is open, and rotates on its side to allow the valve to close. A spring for closing the valve when the pivot mechanism rotates may be substantially oversized, since the spring is not creating a rotating force on the swivel body of the pivot mechanism. When the handle rotates the swivel body from the valve open position, the substantial spring force assists continued rotation of the swivel body and automatically closes the valve.

Existing shutoff valves which employ a pivot mechanism to close the valve utilize a fusible link closure mechanism which is separate from the pivot mechanism. A tetherline connects a spring in the closure mechanism to a valve actuating handle. A fusible link normally holds the spring stretched, so that no force is acting on the handle. The link separates when subjected to an elevated temperature indicative of a fire, thereby releasing the stretched spring to pull the tetherline and rotate the handle to close the valve.

Existing shutoff valves with fusible links are expensive to manufacture. In some cases, the fusible link cannot be mounted in its normally intended position relative to the valve. The tetherline which connects the spring with the handle may separate from either the spring or the handle when subjected to the jarring force of a released spring.

The disadvantages of the prior art are overcome by the present invention, and an improved emergency shutoff valve with a fusible link is hereinafter disclosed. The shutoff valve includes a pivot mechanism to close the valve, and a fusible link mechanism is provided for cooperation with the pivot mechanism.

SUMMARY OF THE INVENTION

The shutoff valve includes a valve element normally retained in an open position by a pivot mechanism. The pivot mechanism comprises a swivel pad fixed with respect to the valve body, and a swivel body pivotally connected to an axially movable stem. The stem extends downward through the swivel pad, and positions the valve element with respect to a valve seat to control fluid flow through the valve. When the swivel body is in its upright position, the base of the swivel body engages the pad to hold the stem upward and the valve open. A handle connected to the swivel body may be used to rotate the swivel body with respect to the stem such that the side of the swivel body now engages the pad, thereby allowing a valve closure spring surrounding the stem to lower the valve element on the seat and close the valve.

The fusible link mechanism comprises a piston housed within a plug, which in turn is threadably secured within the swivel body. A fusible link spring biases the piston downward to engage the pad, although movement of the piston is normally prevented by an annular ring of solid fusible material. When subjected to an elevated temperature, the fusible material melts, and the fusible link spring then forces the piston downward to expel the liquid fusible material into a spring cavity within the swivel body. The fusible link spring forces the piston against the pad to rotate the swivel. Once the swivel body starts to rotate, both the fusible link spring and the valve closure spring contribute to rotate the swivel on its side and thereby close the valve.

It is an object of the invention to provide a shutoff valve which utilizes a pivot mechanism to close the valve, and which incorporates a fusible link mechanism in the swivel mechanism to automatically close the valve when subject to an elevated temperature. A related object of the invention is a cost-effective shutoff valve which has a highly reliable fusible link mechanism.

It is a feature of the invention that the fusible link mechanism acts to engage a swivel pad and cause rotation of the swivel body about the stem to close the valve. When subjected to an elevated temperature, the fusible link mechanism engages the valve body to rotate the swivel body to close the valve. A related feature of the invention is that the fusible link mechanism is normally housed within the swivel body, thereby preventing damage to the link mechanism and improving reliability.

An advantage of this invention is that the spring which biases the stem downward to close the valve need not be sized to minimize inadvertent closure of the valve. Another advantage of the invention is that the fusible link mechanism may be easily replaced. Still another advantage of the invention is the reduced cost of a reliable fusible link mechanism used to close a shutoff valve.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 1:
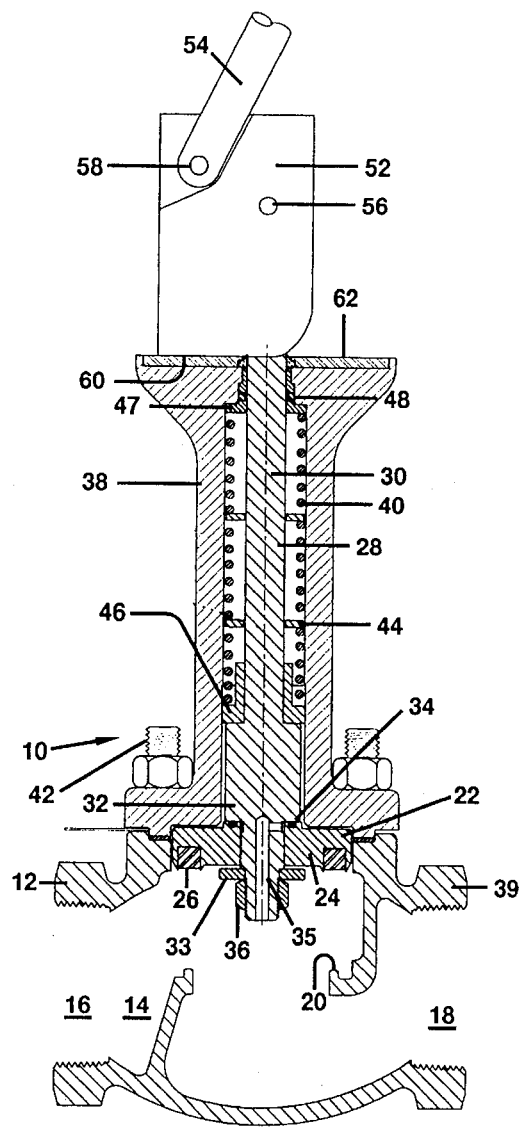
FIG. 1 is a simplified side view of a valve according to the present invention held in the open position by a pivot mechanism.

FIG. 1 depicts a suitable embodiment of an emergency shutoff valve 10 according to the present invention. Those skilled in the art will appreciate that the valve 10 may be used to shutoff flow in a line (not depicted) which transmits various hazardous and/or combustible fluids, such as propane, natural gas or anhydrous ammonia. The valve as depicted in FIG. 1 includes a fluid inlet aligned with the fluid outlet. The valve body alternatively may be formed such that the fluid inlet is at 90° relative to the fluid outlet.

The valve body 12 has a flow path 14 therein between fluid inlet 16 and fluid outlet 18. An annular valve seat 20 is provided within the valve body for engagement with the valve element 22 when the valve is closed. In the FIG. 1 embodiment, the valve element includes a disk 24 carrying a plastic or rubber material ring 26. The ring 26 may be formed from Teflon, and seals with the seat 20 to close off flow through the valve. The valve element 22 is provided at a lower end of the stem 28, which is movable with respect to the valve body along axis 30. When the valve is closed, the enlarged portion 32 of the stem 28 is in engagement with a disk 24, thereby compressing seal 34. When the closed valve begins to be opened by raising the stem 28, the valve element remains in engagement with the seat 20 due to existing upstream pressure while the stem initially moves upward, until the disk 24 is engaged by the washer 33 positioned on the stem 28 by nut 36, whereupon the valve element thereafter rises with the stem. During this opening process, the seal 34 is broken to allow fluid to pass on top of the seal 34 and through the passageway 35 provided in the stem to increase downstream pressure and thereby reduce the force required to open the valve.

The valve body includes upper or bonnet portion 38 affixed to the lower globe body portion 39 by conventional bolts 42. The stem 28 passes through the top of bonnet portion 38, and houses coil spring 40 which surrounds the stem. Spring 40 engages guide 46, which in turn acts on enlarged portion 32 to bias the valve closed. The valve closure spring 40 is compressed when the valve is open, and creates a substantial biasing force. A plurality of springs may be axially separated by disks 44 to obtain a high spring force which is centered about and aligned with the axis 30. A bushing 47 compresses seal 48 which seals between the stem 28 and the bonnet portion 38.

A pivot mechanism 53 includes a swivel body 52 and handle 54 on top of the valve body. As shown more clearly in FIG. 2, the swivel body is rotatably mounted to the upper end of the stem 28 at pin 56. Handle 54 is connected to the swivel body at pin 58, and may be used to manually rotate the swivel body to a valve closed position. A cable (not shown) may also be attached to the handle to rotate the handle and thus the swivel body to close the valve.

Figure 2:
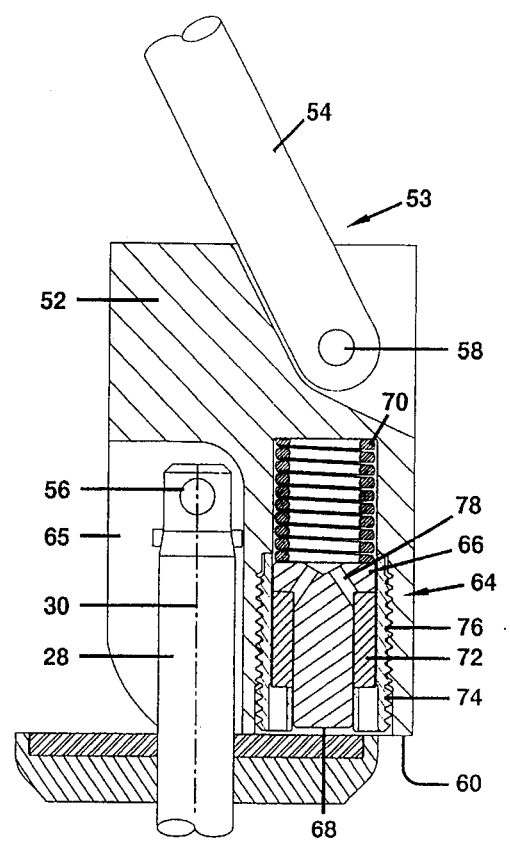
FIG. 2 is a detailed cross-sectional view of the pivot mechanism generally shown in FIG. 1.

Referring again to FIG. 1, a lower base surface 60 of the swivel body engages a planar upper surface 62 on the valve body to normally hold the stem 28 in the "up" or valve open position. FIG. 2 illustrates that the swivel body 52 includes a central cutout 65 for receiving the stem 28, and for allowing the swivel body to rotate with respect to the stem as explained subsequently. The lower portion of the swivel body thus straddles the stem 28. A feature of the invention is that, when the swivel body is in its normal valve open position as shown in FIG. 2, a portion of surface 60 lies within a plane which is inclusive of stem axis 30 and the axis of rotation of pin 56. Accordingly, the force of the spring 40 does not tend to rotate the swivel body to a valve close position until the swivel body is otherwise rotated about the stem, as explained subsequently. In a preferred embodiment, the valve closure spring 40 instead creates a force which retains the swivel body in the valve open position since a portion of surface 60 is on each side of axis 30. The spring 40 may thus be oversized to bias the valve closed with a force substantially in excess of that normally required to close the valve.

Fusible link mechanism 64 is carried by the swivel body 52 and preferably is housed within the swivel body. The mechanism 64 includes a piston 66 movable within the swivel body and having a lower valve body engaging end 68, a fusible link coil spring 70 for biasing the piston 66 downward to engage the valve body, and a ring or disk 72 of a fusible material for normally acting as a solid stop to prevent the spring 70 from moving the piston and rotating the swivel body to close the valve. A retaining nut or plug member 74 is threadably connected to the swivel body at threads 76, and houses the piston 66 and the fusible material ring 72 when the swivel body is in the valve open position.

Figure 3:
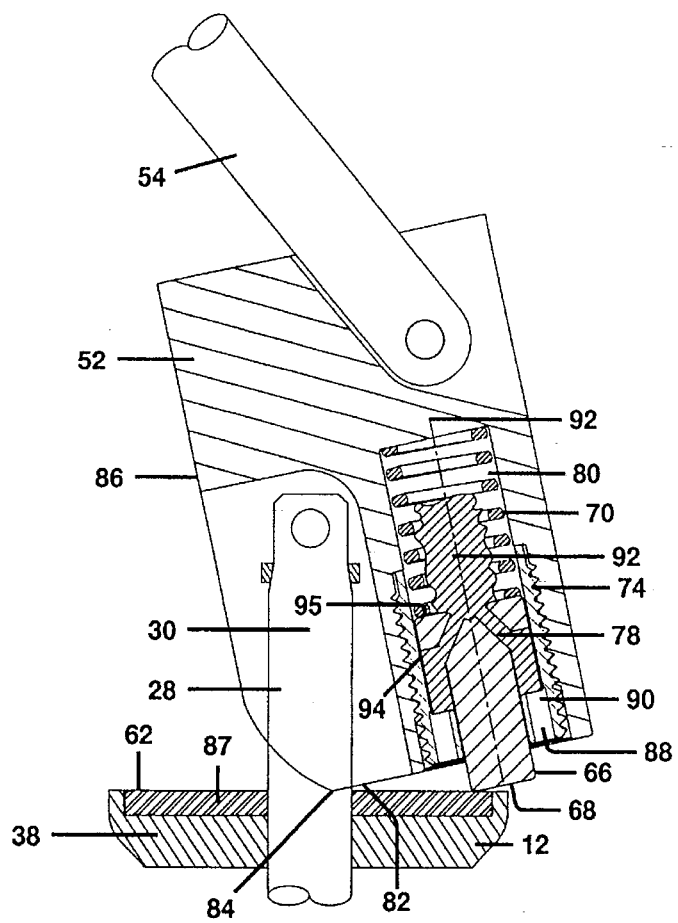
FIG. 3 illustrates a pivot mechanism as shown in FIG. 2 with the swivel body partially rotated by the fusible link mechanism.
Figure 4:
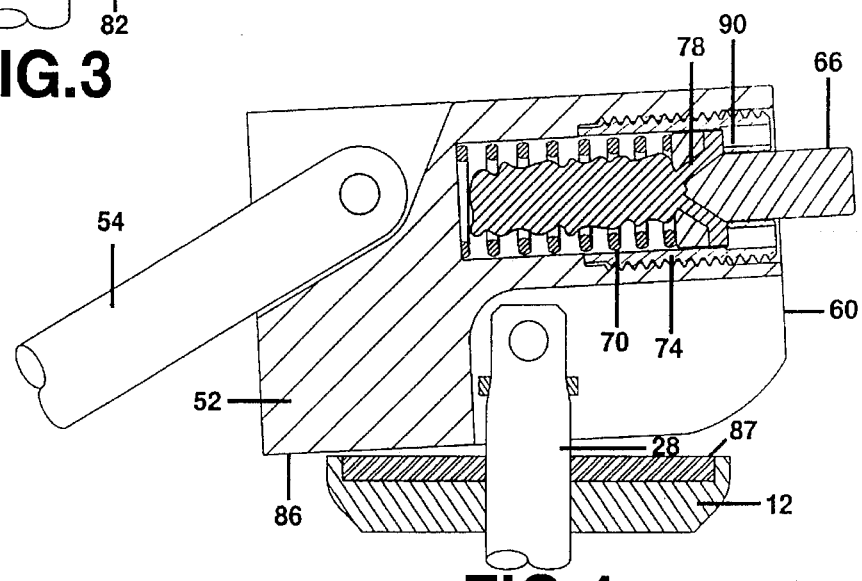
FIG. 4 illustrates a pivot mechanism as shown in FIG. 2 in the valve closed position.

When the valve 10 is subject to an elevated temperature, this solid fused material ring 72 melts. The force of the spring 70 pushes a piston 66 downward to engage the valve body, and expels the melted fusible material through the restricted passageways 78 in the piston 66 and into the cavity 80 in the swivel body 52 which houses the spring 70. Since the piston 66 is offset from the axis 30, the force of the spring 70 pressing the piston into engagement with the valve body rotates the swivel body 52 (in a counterclockwise direction as shown in FIG. 3). As the swivel body rotates, the lower end 68 of the piston slides along the valve body, and increases the radial spacing between the surface 68 on the piston and the axis 30, thereby increasing the torque on the swivel body. Moreover, the portion 82 of the base surface 60 of the swivel body was initially aligned with axis 30, so that the valve closure spring 40 did not tend to rotate the swivel body to the closed position. As this portion 82 moves away from the axis 30, as shown in FIG. 3, the corner 84 of the swivel body engages the valve body at a point spaced from axis 30, and the substantial force of the spring 40 assists in rotating the swivel body closed. When rotated to the valve closed position as shown in FIG. 4, the swivel body has "dropped" so that a side surface 86 of the swivel body normally spaced substantially from the valve body 12 now lies closely adjacent the valve body. When the swivel body is positioned as shown in FIG. 4, the stem is fully downward with the valve element in engagement with the seat and the valve closed. It should be appreciated that, once the fusible material begins to melt, the entire process as described above occurs quite rapidly. A suitable closure mechanism as described herein may move from the valve open position as shown in FIG. 2 to the valve closed position as shown in FIG. 4 in less than one second.

The swivel body 52 may be manufactured from a heat conductive material, such as aluminum. The surface 62 of the valve body engaged by the swivel body when in the open position may be manufactured from stainless steel or other non-corrosive material. To reduce the force required to rotate the swivel body closed when the valve is subject to high temperatures, the valve body may be provided with a pad 87 formed from a low friction material, such as a combination graphite and teflon material. A suitable material for the pad 87 is glass-filled teflon. By providing a pad which has a low frictional engagement with the swivel body 52, the size of the spring 70 and the radial spacing between the fusible link mechanism 64 and the axis 30 may be minimized, thereby reducing the cost of the valve.

The fusible link mechanism 64 may be installed by positioning a fusible link spring 70 within the cavity 80 of the swivel body 52, and threading the plug member 74 to the swivel body with the ring of fusible material 72 and the piston 66 already positioned therein, as shown in FIG. 2. The swivel plug may be provided with a plurality of circumferentially spaced recesses 88 as shown in FIG. 3 which serve as torque surfaces for facilitating the threaded connection between the plug member and the swivel body with a conventional tool (not depicted). High torque will have to be applied to seat the plug member 74 within the swivel body 52 as shown in FIG. 2, since during this installation the spring 70 will be compressed.

Once the fusible link mechanism 64 has been installed in the swivel body 52, it is important that the fusible link material 72 remain in a solid state to act as a stop to prevent the fusible link spring from allowing movement of the piston 66 to engage the swivel body before the valve is subject to an elevated temperature. Preferably, the fusible link material 72 is provided in an annulus between the piston 66 and the plug member 74, and the plug member includes a stop shoulder 95 for preventing the fusible link spring from expelling the fusible link material from the plug member and from the swivel body 52. The fusible link material is thus provided as a ring-shaped member, and is positioned radially outward of the piston 66 with respect to piston axis 92. The upper end 94 of the piston is engaged by the spring 70 and presses downward on the fusible link material. Accordingly, the combination of the piston 66 and the plug member 74 substantially encapsulate the fusible material therebetween. When subjected to the force of the spring 70, the fusible material may cold flow slightly into gaps between the piston 66 and the plug 74. However, the fusible material 72 remains substantially in its original configuration until subjected to a predetermined elevated temperature, which generally will be indicative of the temperature when the valve is subjected to a fire.

Passageways 78 in the piston allow the fusible link material when melted to flow through the piston 66 and into the cavity 80. So that these passageways 78 may form a substantial restriction to premature cold flow of the fusible material. Restricted passageways of this size in the piston serve the dual purpose of both preventing premature cold flow to the cavity 80, while providing a sufficiently large flow passage to allow the fusible material to quickly flow into the cavity 80 when the valve is subjected to a fire. In addition to serving a purpose of substantially encapsulating the fusible material, the piston serves as a reliable member for transmitting force from the spring 70 to engage the pad surface 62 of the valve body and rotate the swivel body 52 to the closed position when subject to a fire.

According to the method of the invention, the swivel body is rotatably connected to the upper end of the stem, with a swivel body having a base surface for engagement with the valve body when the swivel body is in the valve open position to maintain the valve element out of engagement with the seat. A piston, which may have a configuration substantially dissimilar to that shown in the figures, is movably positioned within the swivel body, and the piston is biased to engage the valve body by a spring or other biasing member. The fusible material is provided for normally acting as a solid stop to prevent the piston from moving within the swivel body, but allows the piston to move with respect to the swivel body and engage the valve body for automatically rotating the swivel body to the valve closed position when the solid state of the fusible material is altered in response to the elevated temperature. Flow restriction passageways may be formed within the piston or around the piston, as explained above, so that the fusible material does not prematurely cold flow into a fusible link spring cavity at normal operating temperatures, while allowing the fusible material to quickly pass into the fusible link spring cavity when converted to a liquid. A swivel pad may be provided on the valve body formed from a low friction material for engaging the swivel body. A portion of the base surface of the swivel body is adjacent a plane containing the stem axis to prevent the valve closure spring from rotating the swivel body when the swivel body is in the valve open position. Those skilled in the art will appreciate that the swivel body may also be mechanically rotated by the handle to the valve closed position.

Various types of fusible material may be used according to the present invention. The selected fusible material will in part depend upon the conditions selected for causing the automatic closure of the valve 10 when a temperature is realized in excess of the normal operating temperature to which the valve should be subjected. A suitable fusible material such as the Indalloy™ alloy manufactured by Indium Corporation of America will melt when subjected to a selected temperature of from 40° C. to 150° C., thereby allowing the fusible material to flow through the passageways 78 and into the cavity 80, as shown in FIG. 2. Other fusible link materials may be suitable for acting as a stop to prevent the piston from prematurely moving within the valve body while in a solid state, and may be altered to allow the effective removal of the stop so that the fusible link mechanism will automatically close the valve when the fusible material is subjected to a selected elevated temperature.

Those skilled in the art will appreciate that the valve of the present invention may have various configurations for the valve body, and that the fusible link mechanism as disclosed herein may cooperate with various types of valves with an axially movable stem and a valve element carded by a lower end of the stem for engagement with a seat to close off fluid flow through the valve. The valve is provided with a valve closure spring for biasing the valve element toward the seat, and this spring is preferably positioned circumferentially about the stem so that the biasing force is substantially aligned with the stem axis. Other configurations of a biasing member for pressing the valve element toward the seat could be provided. Passageways could be provided in the plug rather than the piston to expel the fusible link material outside the mechanism 64 when subjected to a fire. The previously described embodiment is preferred, however, since the fusible link material remains continuously sealed between the plug and the swivel body. The swivel body could have various configurations which would allow a base surface of the swivel body to engage the swivel surface on the valve body when in the valve open position. Other configurations of a side surface on the swivel body will allow the swivel body to drop from its initial position when the swivel body is rotated to a valve closed position such that the valve closure spring forces the valve element into engagement with the seat.

The foregoing description of the invention has thus been directed to a preferred embodiment in accordance with the requirements of the patent statutes and for purposes of illustration. It will become apparent, however, to those skilled in the art that many modifications and changes in the specifically described valve and to the method of closing a valve may be made without departing from the scope and spirit of the invention. Therefore, the invention is not restricted to the preferred embodiment illustrated, and instead includes modifications which fall within the scope of the following claims.

What is claimed is:

1. A shutoff valve for closing off flow through a fluid line, comprising:
    a valve body having a flow path therethrough and a seat therein;
    a stem axially movable relative to the valve body;
    a valve element within the valve body and carried by a lower end of the stem for engagement with the seat to close off fluid flow through the valve;
    a valve closure spring for biasing the valve element toward the seat;
    a swivel surface on the valve body and adjacent the stem;
    a swivel body pivotally connected to an upper end of the stem, the pivot body having a base surface for engagement with the swivel surface when in a valve open position to maintain the valve element out of engagement with the seat, and having a side surface positioned adjacent the swivel surface when the swivel body is rotated to a valve closed position to allow the valve closure spring to force the valve element into engagement with the seat; and
    a fusible link mechanism carried by the swivel body for engagement with the swivel surface to rotate the swivel body to the valve closed position when the valve is subjected to an elevated temperature.

2. The shutoff valve as defined in claim 1, wherein the fusible link mechanism further comprises:
    a piston movable within the swivel body and having a pad engaging end;
    a fusible link spring for biasing the piston to engage the swivel pad; and
    a fusible material for normally acting as a solid stop to prevent the fusible link spring from moving the piston to rotate the swivel body to the valve closed position and for allowing movement of the piston when the solid state of the fusible material is altered in response to an elevated temperature.

3. The shutoff valve as defined in claim 2, further comprising:
    the swivel body includes a fusible link spring cavity for receiving the fusible link spring therein; and
    the piston includes a restricted flow passageway between the fusible material and the fusible link spring cavity for passing the fusible material when converted to a liquid into the fusible link spring cavity.

4. The shutoff valve as defined in claim 2, wherein the fusible link mechanism further comprises:
    a plug member threadably connected to the swivel body and housing the piston therein, the plug member and the piston substantially encapsulating the fusible material when acting as a solid stop.

5. The shutoff valve as defined in claim 4, wherein the plug member includes torque surfaces for threading the plug member to the swivel body and compressing the fusible link spring.

6. The shutoff valve as defined in claim 1, further comprising:
    a handle connected to the swivel body for mechanically rotating the swivel body to the valve closed position.

7. The shutoff valve as defined in claim 1, wherein the valve closure spring is a coil spring surrounding the stem.

8. The shutoff valve as defined in claim 1, wherein the surface is on a swivel pad formed from a low friction material.

9. A shutoff valve, comprising:
    a valve body;
    an axially movable stem;
    a valve element carried by a lower end of the stem for engagement with a seat;
    a valve closure spring for biasing the valve element toward the seat;
    a swivel body rotatable connection to an upper end of the stem, the pivot body having a base surface for engagement with the valve body when in a valve open position to maintain the valve element out of engagement with the seat, and having a side surface for positioning the valve body when the swivel body is rotated to a valve closed position to allow the valve closure spring to force the valve element into engagement with the seat;
    a piston carried by and movable with respect to the swivel body along a piston axis for engagement with the valve body to rotate the swivel body to the valve closed position;
    a fusible link spring carried by the swivel body for biasing the piston to engage the valve body; and
    a fusible link material radially outward of the piston with respect to the piston axis for normally acting as a solid stop to prevent the fusible link spring from moving the piston to rotate the swivel body to the valve closed position and for allowing movement of the piston when the solid state of the fusible material is altered in response to an elevated temperature.

10. The shutoff valve as defined in claim 9, further comprising:
    the swivel body includes a fusible link spring cavity for receiving the fusible link spring therein; and
    the piston includes a restricted flow passageway between the fusible material and the fusible link spring cavity for passing the fusible material when converted to a liquid into the fusible link spring cavity.

11. The shutoff valve as defined in claim 9, wherein the fusible link mechanism further comprises:
    a plug member threadably connected to the swivel body and housing the piston therein, the piston and the plug member forming an annulus therebetween for receiving the fusible link material.

12. The shutoff valve as defined in claim 11, wherein the plug member includes a stop shoulder for preventing the fusible link spring from expelling the fusible link material from the plug member.

13. The shutoff valve as defined in claim 9, further comprising:

a handle connected to the swivel body for mechanically rotating the swivel body to the valve closed position.

14. The method of closing a valve including a valve body, an axially movable stem, a valve element carried by a lower end of the stem for engagement with a seat, and a valve closure spring for biasing the valve element toward the seat, the method comprising:

rotatably connecting a swivel body to an upper end of the stem, the pivot body having a base surface for engagement with the valve body when in a valve open position to maintain the valve element out of engagement with the seat, and a side for positioning adjacent the valve body when in the valve closed position;

positioning a piston movable within the swivel body;

biasing the piston to engage the valve body; and providing a fusible material for normally acting as a solid stop to prevent the piston from moving within the swivel body, and for allowing the piston to engage the valve body and automatically rotate the swivel body to the valve closed position when the solid state of the fusible material is altered in response to an elevated temperature.

15. The method as defined in claim 14, further comprising:

providing a fusible link spring cavity within the swivel body for receiving a fusible link spring therein; and forming a restricted flow passageway in the piston between the fusible material and the fusible link spring cavity for passing the fusible material when converted to a liquid into the fusible link spring cavity.

16. The method as defined in claim 15, further comprising:

housing the piston in a plug member; and threadably connecting the plug member to the swivel body.

17. The method as defined in claim 16, further comprising:

compressing the fusible link spring while threadably connecting the plug to the swivel body.

18. The method as defined in claim 14, further comprising:

mechanically rotating the swivel body to the valve closed position with a handle connected to the swivel body.

19. The method as defined in claim 14, wherein a portion of the base surface of the swivel body in engagement with the valve body is adjacent a plane containing an axis of the stem to prevent the valve closure spring from rotating the swivel body when in the valve open position.

20. The method as defined in claim 14, further comprising:

providing a swivel pad on the valve body formed from a low friction material for engaging the swivel body.

* * * * *